(12) United States Patent
Geisberger et al.

(10) Patent No.: US 7,396,894 B2
(45) Date of Patent: Jul. 8, 2008

(54) PROCESS FOR PREPARING LINEAR ORGANOPOLYSILOXANES HAVING SI-H GROUPS

(75) Inventors: Gilbert Geisberger, Altoetting (DE); Tassilo Lindner, Mehring-Oed (DE); Frank Baumann, Tittmoning (DE)

(73) Assignee: Wacker Chemie AG, Munich (DE)

( * ) Notice: Subject to any disclaimer, the term of this patent is extended or adjusted under 35 U.S.C. 154(b) by 409 days.

(21) Appl. No.: 11/109,344

(22) Filed: Apr. 19, 2005

(65) Prior Publication Data

US 2005/0239986 A1    Oct. 27, 2005

(30) Foreign Application Priority Data

Apr. 21, 2004    (DE) .................. 10 2004 019 377

(51) Int. Cl.
   *C08G 77/12*    (2006.01)
(52) U.S. Cl. ........................................ 528/31
(58) Field of Classification Search .......... 528/21, 528/31
   See application file for complete search history.

(56) References Cited

U.S. PATENT DOCUMENTS 5,919,883 A    7/1999    Dittrich et al.
6,143,912 A    11/2000   Lindner et al.
6,232,423 B1   5/2001    Koehler et al.
6,727,303 B2*  4/2004    Ono et al. .............. 524/261

FOREIGN PATENT DOCUMENTS

| EP | 0 967 236    | 12/1999 |
| EP | 0 967 236 A1 | 12/1999 |
| EP | 1 247 811    | 10/2002 |
| WO | WO 96/18670  | 6/1996  |

OTHER PUBLICATIONS

Derwent Abstract corresponding to EP 967 236 [AN 2000-089092].
Derwent Abstract corresponding to WO 96/18670 [AN 1996-278811].

* cited by examiner

*Primary Examiner*—Randy Gulakowski
*Assistant Examiner*—Robert Loewe
(74) *Attorney, Agent, or Firm*—Brooks Kushman P.C.

(57) ABSTRACT

The invention provides a process for preparing linear organopolysiloxanes (P) having diorganosiloxy units and Si—H groups, in which, in a first step, diorganodichlorosilanes (A) and monochlorosilanes (B) and optionally dichlorosilanes (C), at least one of the monochlorosilanes (B) or dichlorosilanes (C) containing Si—H groups, are reacted with at most 0.5 mol of water per mole of hydrolyzable chlorine to give a partial hydrolyzate (T) and gaseous hydrogen chloride, and, in a second step, the SiCl groups still present in the partial hydrolyzate (T) are removed by treating with water to form hydrochloric acid, and a hydrolyzate (H) containing the organopolysiloxanes (P) is obtained.

12 Claims, 1 Drawing Sheet

PROCESS FOR PREPARING LINEAR ORGANOPOLYSILOXANES HAVING SI-H GROUPS

BACKGROUND OF THE INVENTION

1. Field of the Invention

The invention relates to a process for preparing organopolysiloxanes having linear diorganosiloxy units and Si-H groups from organochlorosilanes and water.

2. Background Art

EP 967236 A describes the preparation of hydrogenmethylpolysiloxanes having trimethylsilyl end groups in a two-stage process from methyldichlorosilane, trimethylchlorosilane and water.

The preparation of polysiloxanes having hydrogenmethylsiloxy units and dimethylsiloxy units and trimethylsilyl end groups via the equilibration of hydrogenmethylpolysiloxanes with dimethylpolysiloxanes using an equilibration catalyst is described in WO 96/18670.

SUMMARY OF THE INVENTION

It is an object of the invention to provide a simplified process for preparing linear organopolysiloxanes having diorganocarbylsiloxy units and Si—H groups. This and other objects are achieved by a two step process in which a mixture of diorganodichlorosilanes and at least one Si—H-containing monochlorosilane and/or dichlorosilane are hydrolyzed with at most 0.5 mole water per mole of hydrolyzable chlorine to form a partial hydrolysate and gaseous hydrogen chloride, and full hydrolysis is effected in a second step with water to form hydrochloric acid. In a preferred embodiment, the hydrochloric acid generated in a second step is utilized as a water source for the first step partial hydrolysis.

DETAILED DESCRIPTION OF THE PREFERRED EMBODIMENT(S)

Figure 1:
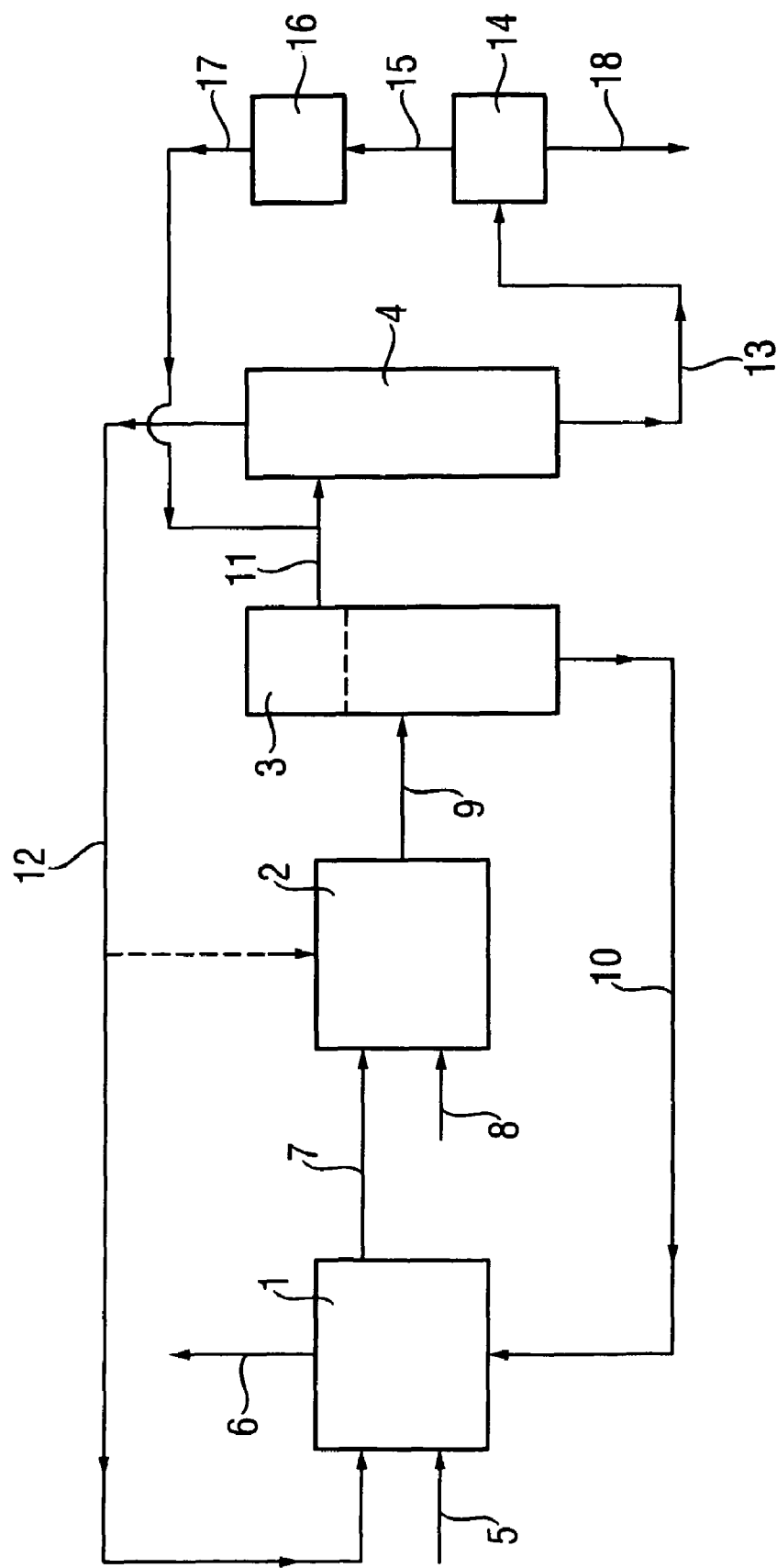
FIG. 1 depicts schematically one embodiment of a process of the present invention.

The invention provides a process for preparing linear organopolysiloxanes (P) having diorganosiloxy units and Si—H groups, in which, in a first step, diorganodichlorosilanes (A) and monochlorosilanes (B) and optionally dichlorosilanes (C), at least one of the monochlorosilanes (B) or dichlorosilanes (C) containing Si—H groups, are reacted with at most 0.5 mol of water per mole of hydrolyzable chlorine to give a partial hydrolyzate (T) and gaseous hydrogen chloride, and, in a second step, the SiCl groups still present in the partial hydrolyzate (T) are removed by treating with water to form hydrochloric acid, and a hydrolyzate (H) containing the organopolysiloxanes (P) is obtained.

In the process, the organopolysiloxanes (P) are prepared directly from the chlorosilanes. The additional process stage needed hitherto, the equilibration of at least two different organopolysiloxanes, is not needed.

The process is simple to control; the formation of branches in the organopolysiloxanes (P) does not occur, since hydrogen elimination is suppressed. The organopolysiloxanes (P) also do not tend to form gels. In addition, a high proportion of the chlorine of the starting materials is recovered as HCl gas.

The hydrolyzable chlorine is present in the form of SiCl groups. In the first step, preference is given to using at least 0.3 mol of water per mole of hydrolyzable chlorine.

The linear organopolysiloxanes (P) having diorganosiloxy units and Si—H groups preferably have the general formula 1

$$R_3SiO(SiR_2O)_m(SiR^1_2O)_nSiR_3 \tag{1}$$

in which

R is hydrogen or an optionally halogen- or cyano-substituted hydrocarbon radical having from 1 to 18 carbon atoms, $R^1$ is an optionally halogen- or cyano-substituted hydrocarbon radical having from 1 to 18 carbon atoms, m is an integer from 0 to 1000 and n is an integer from 1 to 1000, with the proviso that at least one R radical is hydrogen.

The diorganodichlorosilanes (A) used in the first step preferably have the general formula 2

$$R^1_2SiCl_2 \tag{2}$$

in which $R_1$ is as defined above.

The monochlorosilanes (B) used in the first step preferably have the general formula 3

$$R_3SiCl \tag{3}$$

in which R is as defined above.

The dichlorosilanes (C) used in the first step preferably have the general formula 4

$$R_2SiCl_2 \tag{4}$$

in which R is as defined above.

The hydrocarbon radicals R and $R^1$ are preferably each a hydrocarbon radical which is free of ethylenically or acetylenically unsaturated bonds and has from 1 to 18 carbon atoms.

Examples of hydrocarbon radicals R and $R^1$ are alkyl radicals such as the methyl, ethyl, n-propyl, isopropyl, n-butyl, isobutyl, tert-butyl, n-pentyl, isopentyl, neopentyl, and tert-pentyl radicals, hexyl radicals such as the n-hexyl radical, heptyl radicals such as the n-heptyl radical, octyl radicals such as the n-octyl radical and isooctyl radicals such as the 2,2,4-trimethylpentyl radical, nonyl radicals such as the n-nonyl radical, decyl radicals such as the n-decyl radical, dodecyl radicals such as the n-dodecyl radical, octadecyl radicals such as the n-octadecyl radical; cycloalkyl radicals such as the cyclopentyl, cyclohexyl, cycloheptyl and methylcyclohexyl radicals; aryl radicals such as the phenyl, naphthyl, anthryl and phenanthryl radicals; alkaryl radicals such as the o-, m-, p-tolyl radicals, xylyl radicals and ethylphenyl radicals; aralkyl radicals such as the benzyl radical, and the alpha and the β-phenylethyl radicals.

Examples of substituted hydrocarbon radicals R and $R^1$ are cyanoalkyl radicals such as the β-cyanoethyl radical, and halogenated hydrocarbon radicals, for example haloalkyl radicals such as the 3,3,3-trifluoro-n-propyl radical, the 2,2,2',2',2'-hexafluoroisopropyl radical, the heptafluoroisopropyl radical, and haloaryl radicals such as the o-, m-, and p-chlorophenyl radicals.

The R and $R^1$ radicals are preferably each a phenyl radical or linear alkyl radical, especially those having from 1 to 10, particularly from 1 to 6, carbon atoms. Particularly preferred hydrocarbon radicals R and $R^1$ are n-propyl, ethyl, and especially the methyl radical.

m is preferably at most 200, in particular at most 50. n is preferably at most 500, in particular at most 250.

Preferred mixtures used in the first step are (Methyl=Me):
Me$_3$SiCl/Me$_2$SiCl$_2$/MeSiHCl$_2$
Me$_3$SiCl/propylMeSiCl$_2$/MeSiHCl$_2$
Me$_3$SiCl/Me$_2$SiCl$_2$/phenylMeSiCl$_2$/MeSiHCl$_2$
Me$_2$SiHCl/Me$_2$SiCl$_2$
Me$_2$SiHCl/Me$_2$SiCl$_2$/MeSiHCl$_2$ The process according to the invention is outstandingly suitable for preparing non-volatile organopolysiloxanes (P), e.g. polydimethylsiloxanes having Me$_2$HSi end groups or SiH-containing polysiloxanes having trimethylsilyl end groups. The organopolysiloxanes (P) preferably have a viscosity of from 1 to 1200 mPas at 25° C.

The first step of the inventive process is preferably carried out in the presence of a water-insoluble organic solvent having a density of at most 0.9 kg/l (S). In the context of this invention, a water insoluble organic solvent (S) refers to solvents in which the solubility at 25° C. is below 1 g of solvent/100 g of water, for example toluene, xylene, carbon tetrachloride, or n-octane. Preference is given to toluene.

The partial hydrolyzate (T) formed in the first step consists of partly Cl- and in some cases OH-terminal organopolysiloxanes and cyclic siloxanes. The content of SiCl groups which are still present in the partial hydrolyzate (T) is preferably from 0.5 to 5% by weight, in particular from 1.0 to 2% by weight.

The first step of the process is preferably carried out at a temperature of from 0 to 80° C., in particular from 10 to 30° C., and a pressure of from 900 to 1600 hPa.

The hydrogen chloride gas obtained in the first step may be used directly in other processes, for example with methanol to prepare chloromethane which is in turn used in the methylchlorosilane synthesis. Thus, chlorine can be confined within a cycle without being released to the environment.

In the second step, the chlorine content of the partial hydrolyzate (T) is reacted fully with water. The hydrochloric acid which is formed preferably has an HCl content of from 3 to 20% by weight, in particular from 5 to 10% by weight.

In a particular embodiment of the process, hydrochloric acid formed in the second step is used as a water source in the first step. Preference is given to using in the first step at least 90%, in particular at least 95%, of the hydrochloric acid formed in the second step. In a particularly preferred embodiment of the process, the maximum amount of water used is sufficient to fully convert the water of the hydrochloric acid formed in the first step.

The chain lengths and viscosities of the organopolysiloxanes (P) are controlled via the weight ratio of the chlorosilane mixtures used.

The second step of the process is preferably carried out at a temperature of from 0 to 100° C., in particular from 10 to 60° C., and the pressure of the surrounding atmosphere, i.e. at from 900 to 1100 hPa.

In a preferred embodiment, the hydrolyzate (H) obtained after the second step is admixed with a rearrangement catalyst in order to increase the proportion of less volatile, substantially linear polysiloxanes. These catalysts are preferably strongly acidic ion exchangers, more preferably based on polystyrene and functionalized with sulfonic acid groups. The catalyst is preferably charged into a tubular reactor and in particular as a loose packing, but it may also be present in the form of a structured packing.

In a further preferred embodiment, the hydrolyzate (H) obtained after the second step is separated into organopolysiloxanes (P) and volatile mixture (M) comprising organopolysiloxanes. The mixture (M) is preferably recycled into the first step and/or second step or rearranged fully or partly to give less volatile, substantially linear organopolysiloxanes.

The mixture (M) is preferably removed by distillation, in which case it is more preferably carried out in two stages into mixtures (M1) and (M2). The mixtures (M), (M1), (M2) are predominantly short-chain linear and cyclic organohydrogensiloxanes and, where appropriate, the solvent (S). In a first distillation stage, it is primarily the optionally used solvent (S) that is removed. This may be fed back in the first or second process step. The second distillation stage serves primarily to remove an organohydrogensiloxane mixture which is preferably rearranged.

The use of the distillation may serve for the recovery of cyclic organohydrogenpolysiloxanes.

The first distillation stage is preferably carried out at a temperature of from 50 to 150° C., in particular from 60 to 120° C., and at an absolute pressure of 50 to 1100 hPa. The second distillation stage is carried out preferably at a temperature of from 80 to 200° C., in particular from 120 to 160° C., and an absolute pressure of from 1 and 30 hPa.

Preference is given to recycling the mixtures (M), (M1), (M2) into the first step. Particular preference is given to carrying out a rearrangement in the presence of a rearrangement catalyst with the mixtures (M), (M1), (M2), optionally after removing the solvent (S). The catalysts are preferably the above-described catalysts usable for the hydrolyzate (H).

During the contact time, the predominant proportion, preferably from 80 to 95% by weight, of the volatile organohydrogenpolysiloxane, is rearranged to give nonvolatile, substantially linear organohydrogenpolysiloxane. The mixtures (M), (M1), (M2), in particular a mixture of components (M1) and (M2), preferably contain up to 60% by weight of solvent (S), but more preferably from 15 to 25% of solvent (S).

The mixtures (M), (M1), (M2) may be contacted with catalyst in a reaction vessel. Useful reaction vessels are any reaction vessels such as stirred tanks and in particular tubular reactors. The mixtures (M), (M1), (M2) may either be introduced from above through the catalyst bed or they flow through the catalyst column from the bottom upward by means of a pump, preference being given to flow from below by means of a pump.

Decisive factors for the degree of rearrangement are amount of catalyst, residence time and temperature. Contact times of from one minute to one hundred and twenty minutes are preferred, and contact times of from two to 30 minutes are particularly preferred. The rearrangement is preferably carried out at temperatures of from −30° C. to +200° C., more preferably from 0 to 30° C., and preferably at the pressure of the surrounding atmosphere, i.e. from about 900 to 1100 hPa.

The process of the invention may be carried out batchwise, semicontinuously or fully continuously, preference being given to the use of the fully continuous operation of the two steps and optionally the removal, processing and feeding of the mixtures (M), (M1), (M2) in a combined plant system.

FIG. 1 shows a preferred embodiment of the process according to the invention:

In a first step, the chlorosilane mixture is fed into the loop reactor (1) via line (5), hydrochloric acid via line (10) and the distillate of the thin-film evaporator (4) via line (12). The streams removed are gaseous hydrogen chloride via line (6) and the prepared partial hydrolyzate (T) via line (7). The partial hydrolyzate (T) is metered into the loop reactor (2) via line (7) and water via line (8).

The entire reaction mixture is then fed into a separator (3) via line (9). There, the hydrochloric acid is removed as the lower phase and recycled into the loop reactor (1) via line (10). The upper phase is fed into the first distillation unit (4) via line (11). The volatile constituents are recycled into the loop reactor (1) via line (12). Optionally, a portion of the volatile constituents is branched off from line (12) and recycled into the loop reactor (2). The effluent (13) is fed into the second distillation unit (14). The volatile constituents are metered into the rearrangement reactor (16) via line (15). The rearranged stream is recycled into the distillation unit (4) via line (17). The effluent (18) comprises organohydrogenpolysiloxane.

All of the above symbols of the above formulae are defined independently of one another. In all formulae, the silicon atom is tetravalent.

In the context of the present invention, unless stated otherwise in each case, all amount and percentage data are based on the weight, all temperatures are 20° C. and all pressures are 1.013 bar (abs.), and all viscosities are determined at 25° C.

EXAMPLES

The reference numerals relate to FIG. 1.

Example 1

100 kg/h of methyldichlorosilane, 34 kg/h of dimethyldichlorosilane and 7.0 kg/h of trimethylchlorosilane are fed at 30° C. into the loop reactor (1) via line (5), together with 60 l/h of distillate from the thin-film evaporator (4) containing 30% by weight of low molecular weight hydrogenmethylsiloxanes and 70% by weight of toluene via line (12), and hydrochloric acid from separator (3) via line (10). The hydrogen chloride which is formed is removed from the reactor in gaseous form. The partial hydrolyzate which leaves the loop reactor (1) is conducted into the loop reactor (2) via line (7) as a homogeneous phase having a chlorine content of 15 g/kg, and mixed there with 20 kg/h of water.

The reaction mixture leaving the loop reactor (2) is fed via line (9) into the separator (3). There, separation is effected into an upper, organic hydrolyzate phase and a lower, aqueous phase which corresponds to approx. 6% by weight of hydrochloric acid. The lower phase is recycled into the loop reactor (1) via line (10). The organic hydrolyzate phase is heated at up to 160° C. and 1 mbar (absolute) via two distillation stages in (4). The distillate stream (15) obtained in the second distillation stage (14) is fed fully into a rearrangement reactor (16) which is designed as a fluidized bed reactor the inlet flow into which is directed from below, and which has a catalyst bed of a sulfonated polystyrene resin. The rearrangement reaction is carried out at 20° C. and an absolute pressure of 1100 hPa. The rearranged TFE condensate (17) is fed back into the distillation part of the plant (4).

The effluent (13) contains linear trimethylsilyl-terminated hydrogenmethylpolysiloxanes having dimethylsilyl groups (H content 1.1%, viscosity 30 mm²/sec).

Example 2

94 kg/h of dimethyldichlorosilane and 4.0 kg/h of dimethylchlorosilane are fed into the loop reactor (1) via line (5), 50 l/h of distillate of the thin-film evaporator (4) via line (12) and hydrochloric acid from separator (3) via line (10). The hydrogen chloride which is formed is removed from the reactor in gaseous form. The partial hydrolyzate which leaves the loop reactor (1) is conducted into the loop reactor (2) via line (7) as a homogeneous phase having a chlorine content of 20 g/kg and mixed there with 25.0 kg/h of water.

The reaction mixture which leaves the loop reactor (2) is fed into the separator (3) via line (9). There, separation is effected into an upper, organic hydrolyzate phase and a lower, aqueous phase. The lower phase is recycled into the loop reactor (1) via line (10). The organic hydrolyzate phase is heated at up to 160° C. and 1 mbar (absolute) via two distillation stages in (4). The distillate stream (15) which is obtained in the second distillation stage (14) is fed fully into the rearrangement reactor (16) which is designed as a fluidized bed reactor as in Example 1. The rearrangement reaction is carried out at 20° C. and an absolute pressure of 1100 hPa. The rearranged TFE condensate is fed back into the distillation part of the plant (4).

The effluent (13) contains linear hydrogen-terminated dimethylpolysiloxane (H content 0.05%, viscosity 60 mm²/sec).

While embodiments of the invention have been illustrated and described it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A process for preparing linear organopolysiloxanes (P) containing both diorganosiloxy units and Si—H groups, comprising, in a first step, reacting diorganodichlorosilanes (A) and monochlorosilanes (B) and optionally dichlorosilanes (C), at least one of monochlorosilanes (B) or dichlorosilanes (C) containing Si—H groups, with at most 0.5 mol of water per mole of hydrolyzable chlorine to give a partial hydrolyzate (T) and gaseous hydrogen chloride, and, in a second step, removing SiCl groups still present in the partial hydrolyzate (T) by reacting with water to form hydrochloric acid, and recovering a hydrolyzate (H) containing organopolysiloxanes (P), wherein the hydrolyzate (H) obtained after the second step is contacted with a rearrangement catalyst.

2. The process of claim 1, wherein the linear organopolysiloxanes (P) comprise organopolysiloxanes of the formula 1

$$R_3SiO(SiR_2O)_m(SiR^1{}_2O)_nSiR_3 \quad (1)$$

in which

R is hydrogen or an optionally halogen- or cyano-substituted hydrocarbon radical having from 1 to 18 carbon atoms, R¹ is an optionally halogen- or cyano-substituted hydrocarbon radical having from 1 to 18 carbon atoms, m is an integer from 0 to 1000 and n is an integer from 1 to 1000, with the proviso that at least one R radical is hydrogen.

3. The process of claim 2, in which the diorganodichlorosilanes (A) used in the first step comprise those of the formula 2

$$R^1{}_2SiCl_2 \quad (2)$$

in which R¹ is an optionally halogen- or cyano-substituted hydrocarbon radical having from 1 to 18 carbon atoms.

4. The process of claim 2, wherein the monochlorosilanes (B) used in the first step comprise those of the formula 3

$$R_3SiCl \quad (3)$$

in which R is hydrogen or an optionally halogen- or cyano-substituted hydrocarbon radical having from 1 to 18 carbon atoms.

5. The process of claim 2, wherein the dichlorosilanes (C) used in the first step comprise those of the formula 4

$$R_2SiCl_2 \qquad (4)$$

in which R is hydrogen or an optionally halogen- or cyano-substituted hydrocarbon radical having from 1 to 18 carbon atoms.

6. The process of claim 1, in which the diorganodichlorosilanes (A) used in the first step comprise those of the formula 2

$$R^1{}_2SiCl_2 \qquad (2)$$

in which $R^1$ is an optionally halogen- or cyano-substituted hydrocarbon radical having from 1 to 18 carbon atoms.

7. The process of claim 1, wherein the monochlorosilanes (B) used in the first step comprise those of the formula 3

$$R_3SiCl \qquad (3)$$

in which R is hydrogen or an optionally halogen- or cyano-substituted hydrocarbon radical having from 1 to 18 carbon atoms.

8. The process of claim 1, wherein the dichlorosilanes (C) used in the first step comprise those of the formula 4

$$R_2SiCl_2 \qquad (4)$$

in which R is hydrogen or an optionally halogen- or cyano-substituted hydrocarbon radical having from 1 to 18 carbon atoms.

9. The process of claim 1, wherein hydrochloric acid formed in the second step is used in the first step as a water source.

10. The process of claim 1, wherein the first step is carried out in the presence of a water-insoluble organic solvent having a density of at most 0.9 kg/l (S).

11. The process of claim 1, wherein both steps are carried out continuously.

12. A process for preparing linear organopolysiloxanes (P) containing both diorganosiloxy units and Si—H groups, comprising, in a first step, reacting diorganodichlorosilanes (A) and monochlorosilanes (B) and optionally dichlorosilanes (C), at least one of monochlorosilanes (B) or dichlorosilanes (C) containing Si—H groups, with at most 0.5 mol of water per mole of hydrolyzable chlorine to give a partial hydrolyzate (T) and gaseous hydrogen chloride, and, in a second step, removing SiCl groups still present in the partial hydrolyzate (T) by reacting with water to form hydrochloric acid, and recovering a hydrolyzate (H) containing organopolysiloxanes (P), wherein the hydrolyzate (H) obtained in the second step is separated into organopolysiloxanes (P) and a mixture (M) comprising volatile organopolysiloxanes, and the mixture (M) is recycled into the first step and/or second step or rearranged fully or partly to give less volatile, substantially linear organopolysiloxanes.

* * * * *